May 12, 1964
F. J. LUKETA
3,132,434
EXPANDER RING AND TRAP FOR TRAWL NETS
Filed Jan. 30, 1961
3 Sheets-Sheet 1
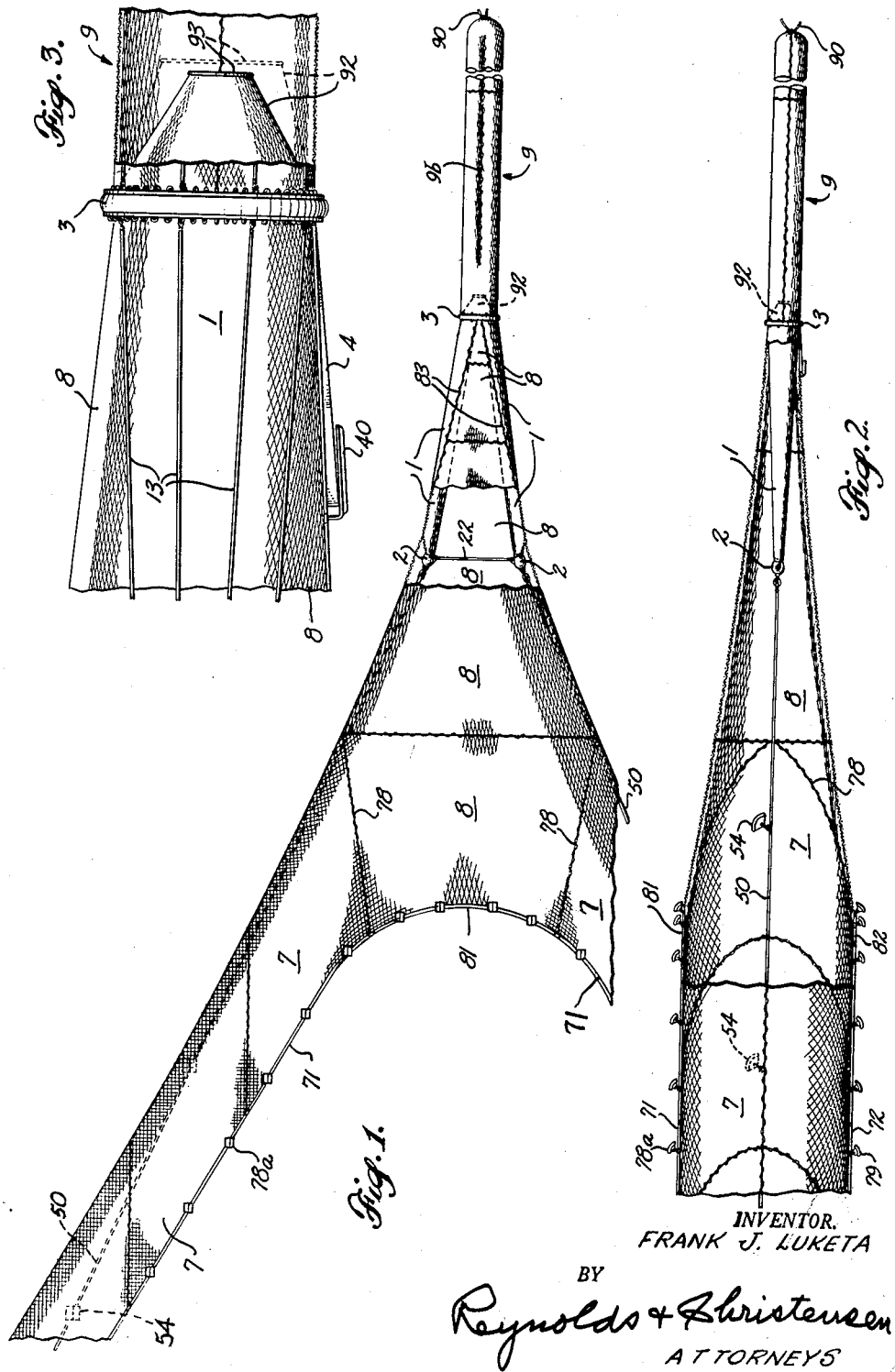
INVENTOR.
FRANK J. LUKETA
BY
Reynolds & Christensen
ATTORNEYS May 12, 1964   F. J. LUKETA   3,132,434
EXPANDER RING AND TRAP FOR TRAWL NETS
Filed Jan. 30, 1961   3 Sheets-Sheet 2

INVENTOR.
FRANK J. LUKETA
BY
Reynolds & Christensen
ATTORNEYS

May 12, 1964  F. J. LUKETA  3,132,434
EXPANDER RING AND TRAP FOR TRAWL NETS
Filed Jan. 30, 1961  3 Sheets-Sheet 3
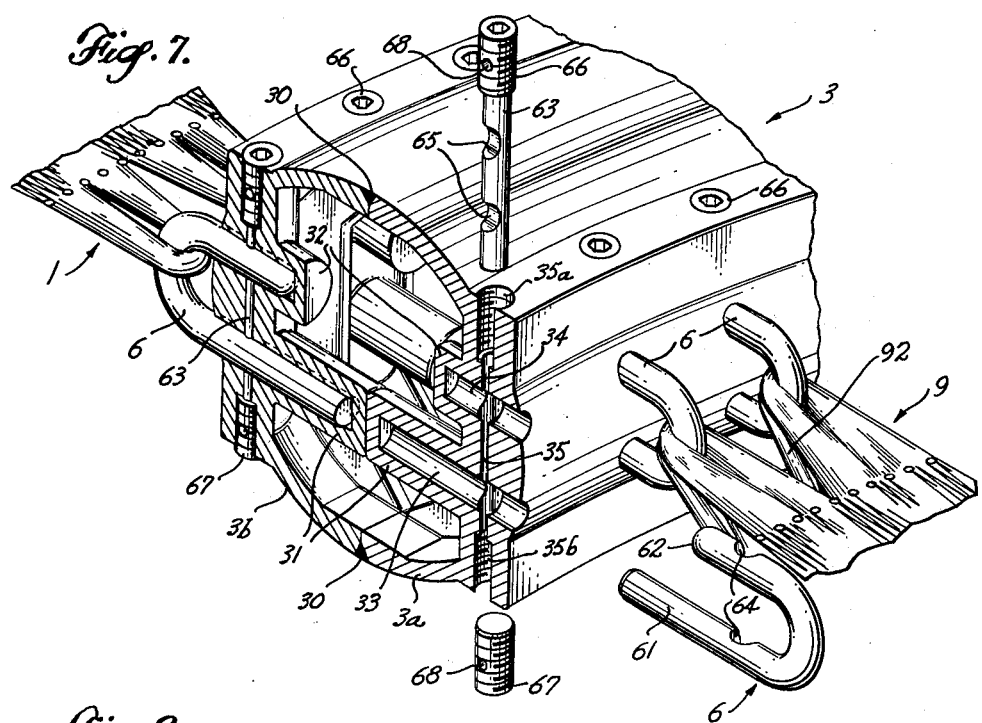
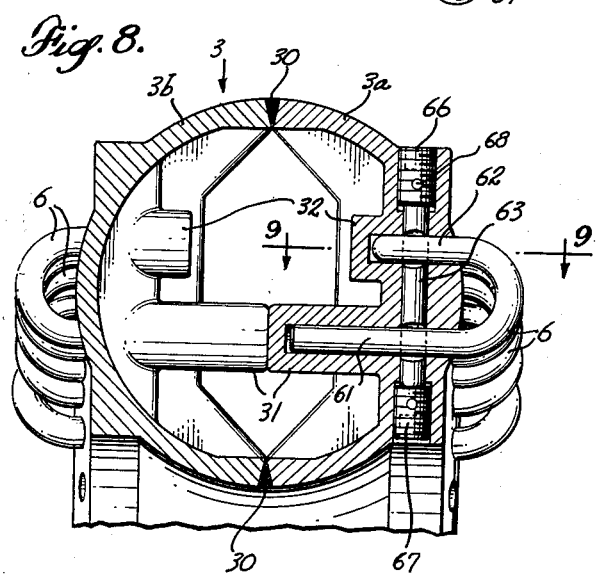
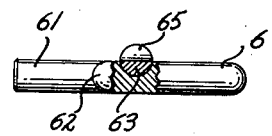
INVENTOR.
FRANK J. LUKETA
BY
Reynolds & Christensen
ATTORNEYS

United States Patent Office 3,132,434
Patented May 12, 1964

3,132,434
EXPANDER RING AND TRAP FOR TRAWL NETS
Frank J. Luketa, 5567 Greenwood Ave., Seattle 3, Wash.
Filed Jan. 30, 1961, Ser. No. 85,662
11 Claims. (Cl. 43—9)

The midwater trawl net disclosed in my companion application, entitled Large Capacity Midwater Trawl Net, Serial No. 80,170, filed January 3, 1961, includes an elongated cod end trailing aft of tensioned suspenders of netting, from each of which a sweep line extends forwardly to a door. A funnel of netting encloses the points of connection of the sweep lines to the concentrated forward ends of the two suspenders, and diverges forwardly from the open forward end of the cod end, but since it bears no part of the pull of the net it is only lightly tensioned, while the suspenders and cod end take the entire drag of the net and catch and are heavily tensioned longitudinally, particularly during hauling in, and each suspender distributes evenly the concentrated pull of its sweep line to half of the cod end's forward end.

Also, the said trawl net discloses a closure within the open forward end of the cod end which is elastically expansible to admit fish from the funnel to the cod end, and contractible to bar their escape.

Such a net can only operate successfully if the entrance to the cod end is positively kept open, despite the tensional loads combined with a particular net design, which will tend to contract it. If the entrance were to close fish could not enter the cod end, and many such might escape over and beneath the bosoms of the funnel. One object of this invention is to provide a rigidly open ring that will always expand or define such an entrance, open at all times except as closed by the contractible closure.

Furthermore, the heavily tensioned mesh of the cod end and of the suspenders should not be woven together, for so doing might make difficult removal and replacement of a damaged mesh panel of one or the other thereof, as is sometimes necessary, and the preferred arrangement joins the adjoining edges of the cod end and of a suspender to such an expander ring as a common anchorage, from which either can be readily disconnected if need arises. The provision of structure to this end, and in particular a structure readily disconnectible and reconnectible, is a further object of this invention.

Certain such objects are equally applicable to a midwater trawl net or to a bottom trawl net, hence the expander ring should have neutral or near neutral buoyancy in either type net with the ring weighted internally at its bottom to aid stability. When used on a bottom net the ring may be somewhat flattened to prevent its tendency to roll laterally when being towed along an inclined bottom.

In accordance with this invention a rigid expander ring is located at the mouth or entrance to a cod end of mesh, from which entrance a suspender or suspenders of mesh (usually two) extend forwardly each to a connector at a point ahead of the entrance, but which suspender or suspenders is or are distributed at least part way about the entrance to the cod end. The tension initiated by the pull of a towing warp tends to constrict the mesh of the suspender, and this would tend to constrict the mesh of the cod end and to close its entrance against the fish, except as the rigid expander ring, encircling the entrance and secured there, holds the entrance open.

The rigid expander ring is conveniently secured in place by providing it with means outstanding from its forward and aft sides or faces for engagement within the edge meshes of the cod end and of the suspender, respectively, with means to maintain the edge meshes of each spaced circumferentially about the ring. More specifically the means engageable within the meshes comprise clevises each having a long and a short leg removably retained by securing means in bores extending fore and aft in the ring, whereby upon release of the securing means a clevis may have its short leg withdrawn from the bore to engage or disengage the associated edge meshes while the longer leg remains in its bore. An elastically constricted annular mesh closure of rearwardly tapered form extends aft from the ring into the forward part of the cod end, such closure having forward edge meshes which are also engaged with and held open by the means engaging the meshes of the cod end.

With such objects in mind, and others that will appear hereinafter, this invention comprises the novel expander ring for use in the manner and at the location indicated, as shown in the accompanying drawings, described herein, and defined in the claims.

FIGURE 1 is a plan view of a midwater trawl net, partly broken away, and incorporating the expander ring of this invention.

FIGURE 2 is a partial longitudinal section along a vertical median plane, and in part a side elevation, showing the net of FIGURE 1.

FIGURE 3 is an enlarged detail side elevational view including the suspender, the cod end, the expander ring, and the closure.

FIGURE 7 is a detail isometric view in section through the expander ring, and FIGURE 8 is a transverse sectional view through the same.

FIGURE 9 is a detail section at the line 9—9 of FIGURE 8.

Figure 4:
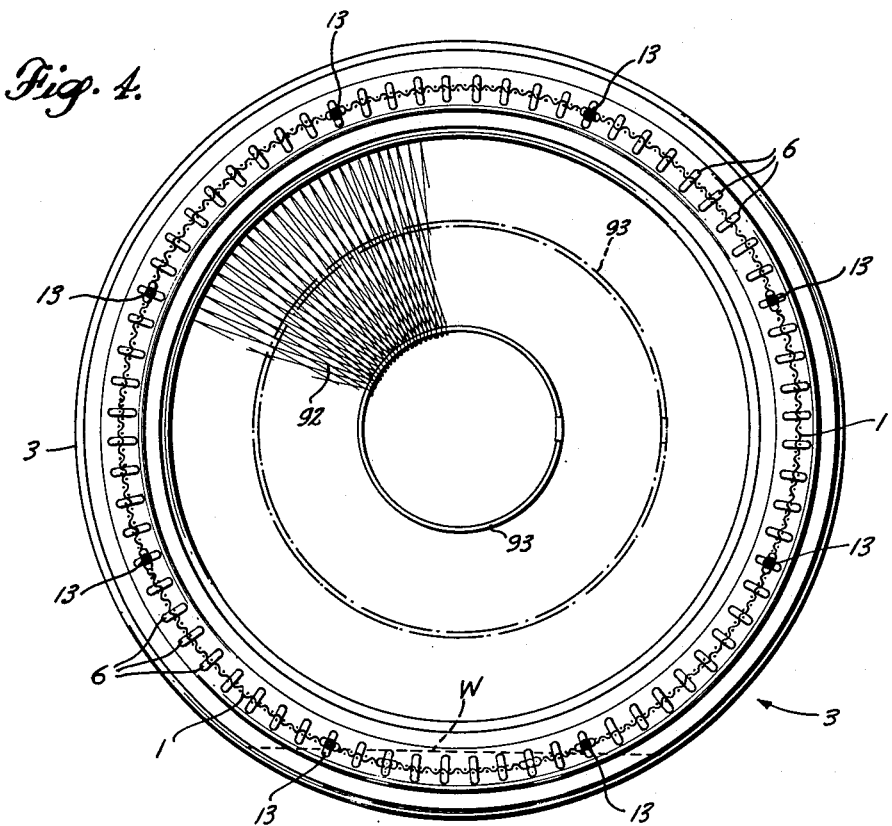
FIGURE 4 is a transverse sectional view, looking towards the expander ring and cod end from just ahead.
Figure 5:
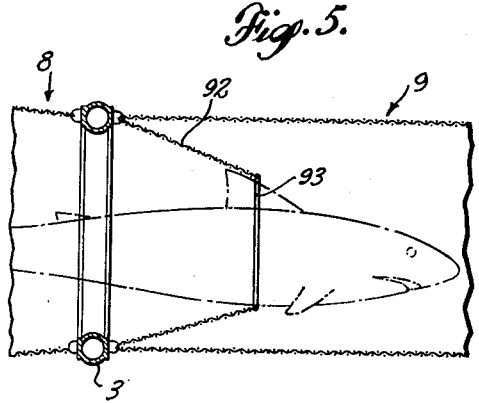
FIGURES 5 and 6 are longitudinal sectional views, similar to FIGURE 3, showing the expansibility of the closure to differently sized fish, and the manner it entraps them within the cod end.

FIGURES 1, 2 and 3 show the expander ring in relation to other net elements or components. The elongated cod end 9 of heavy mesh trails aft from the expansion ring 3, being closed at its after end during trawling by a purse line 90. A funnel 8 of light twine netting diverges forwardly from the expander ring, suspenders 1 of heavy twine netting extending forwardly from the expander ring to a connector 2, one at each side, whereto sweep lines 50 are connected, and extend forwardly. Lacing lines 83 join the longitudinal edges of funnels and suspenders. A restrictor 22 joins the connectors to hold the connectors inwardly from the funnel side walls, and to prevent undue lateral spreading and consequent vertical contraction of the funnel. Curtains 7 join the funnel's side walls at lacing lines 78, and curtain lines 71 and 72, joined by bosom lines 81, 82 respectively spread forwardly, the upper and lower edges of the curtains being secured to these respective curtain lines. The latter are buoyed up at 78a and depressed at 79, to keep the curtain lines spread apart vertically. Similar buoys 54 hold up the sweep line 50. A spiller 4 and its protective flap 40 permit fish in excess of the cod end's capacity to escape, to avoid interference with the hauling operation. Riblines 13 minimize transverse rips or tears. Joining the top and bottom of the cod end along line 9b insures adequate total cod end longitudinal tensile strength without an excessive cod end cross-sectional area when filled with fish.

It is with the expander ring 3 and its relation to the adjoining netting (suspenders, cod end and closure) that this invention is concerned.

Netting is available commercially in a variety of twine sizes, mesh sizes, and materials. Netting which is to be heavily stressed in use should be of a twine size and material to give adequate resistance to the expected stress.

Its mesh should be so oriented in relation to the direction of stress—generally longitudinal—that the stress is applied in the straight-twine direction, and not cross-twine. Furthermore, a given twine size may be adequate to sustain a given total load, when knotted into a woven mesh and distributing loads among the different meshes, yet if the points along a selvage edge loop about a pin, ring, or the like, the entire load on both legs of a point is concentrated at the pin, ring, or the like, and at the point where the loads on the individual legs are concentrated, the load is doubled. It is therefore essential, to withstand such a doubled load, that the selvage edge so looped be doubled. The mesh of the cod end 9 and of the suspenders 1 in such a net is heavily stressed when the catch is large, and its squares are elongated, but the funnel 8, curtains 7 and closure 92 are but lightly stressed at any time, being subject primarily only to water drag. The netting panels from which the cod end and the suspenders are made are therefore of heavy twine size and their double-selvage edges are located at forward and rear edges of each such panel. The funnel and closure mesh being lightly stressed, their twine size is small and its orientation is of lesser importance.

The expander ring 3, preferably of aluminum, is made of two like hollow halves, 3a and 3b, joined as by welding at 30. Internally each half is formed with equiangularly spaced bosses 31, 32 drilled at 33, 34 to receive the unequal legs 61, 62 of a clevis 6. The halves are cross-bored at 35, intercepting the bores 33, 34, for the reception of locking pins 63; the legs of the clevis 6 are notched at 64 to receive the round portion of the locking pin when the latter is in locking position, and the locking pin is notched at 65 to enable withdrawal of the legs pin from their bores when the locking pin is rotated 180° from its locking position. A threaded head 66 threads home into an end 35a of the bore 35, and a threaded plug 67 threads into the opposite end 35b of bore 35, and abuts the end of locking pin 63 to serve as an adjustable stop to position the locking pin correctly as to depth. Each of the threaded elements 66 and 67 may be formed with a plug 68 of a material such as nylon inset into it, but engageable with the threaded bore of the ring 3. This produces sufficient frictional resistance to rotation of the elements 66, 67 as will assist in retaining such threaded elements against turning accidentally.

There are usually several double selvage points of the suspender and of the cod end netting connected to each clevis 6 to minimize the number of clevises needed—with the same number on each side of the expander ring. The ring is internally weighted at W (FIGURE 4), tending to keep its upper portion uppermost. When the suspenders 1, for example, are to be connected to the ring 3, the ring is first laid horizontally then the locking pins 63 at the appropriate side of the ring are rotated 180° to register their notches 64 with the round of the legs 61, 62. Each clevis leg 62 is pulled from its bore 34, leaving the longer leg 61 still within its bore 33, and the clevis is rotated about leg 61. Now several points of the double selvage edge of suspenders 1 at each side are engaged with each successive clevis 6, and the latter is rotated back, its short leg 62 reentered within the bore 34, and the locking pin 63 rotated to and fixed in locking position. The suspenders are now very securely joined to the expander ring 3. In like manner (after first turning the ring over on its other side) the opposite half of the ring is joined to the double selvage at the forward end of the cod end. This effects a secure juncture between suspenders and cod end, yet whenever necessary disconnection is readily accomplished.

Figure 6:
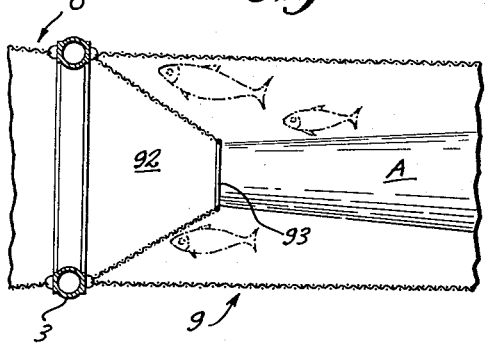

The closure 92 is formed by a tube of netting of small mesh and heavy twine size, and is joined about its forward edge to the expander ring 3 at the same time and in the same way as the cod end. Its rear edge is constricted normally by an elastic constrictor 93, running through its selvage edge. This constriction tends to concentrate water as though by a funnel, into a rearwardly directed jet or stream A (see FIGURE 6), and fish which approach or are guided into the funnel 8 pass through the closure and into the cod end 9. There they may swim forwardly, seeking to escape, but the stream A discourages direct approach from the rear, and the reentrant angle between closure and cod end mesh blocks their exit.

The closure's constricted outlet should be of small diameter to give a strong jet effect and smaller escape target, yet this is only possible because the constrictor 93 is elastic, for without this elasticity the closure could be plugged by some large fish being gilled in the constriction, or a shark hung up between its dorsal and pectoral fins, thus making further towing unproductive. Also when a continuous mass or concentration of fish seeks to enter the cod end through the closure this elasticity of the constriction prevents a bottleneck.

Were there no expander ring, and the suspenders at their rear end meshes were distributed about and connected directly to the forward end meshes of the cod end, the pull concentrated at the connectors 2 would constrict the meshes of the suspenders, and in turn those of the cod end. This would so close down the entrance to the cod end as virtually to exclude fish. The presence of the expander ring 3 at the entrance, and its securement there (however it may be secured) holds the entrance fully open at all times, yet the pull is still concentrated wholly upon the suspenders and the cod end, both of heavy twine, and not upon the funnel 8 or curtains 7, both of which are of relatively light twine, held open or apart by water reaction as they move ahead.

I claim as my invention:

1. In combination with a trawl net including a cod end of mesh having an entrance opening at its forward end, suspender means of mesh distributed at its after end about the entrance to the cod end and at least part way about the entrance to the cod end and concentrated at a point at its forward end, whereby tension in the suspender means during use tends to constrict its after end, and an expander ring which is noncollapsible in use connected to the after end of the suspender means and about the entrance to the cod end, to prevent transmission of the constrictive tendency from the suspender means to the cod end entrance, and to hold such entrance open despite such constrictive tendency.

2. An expander ring for trawl nets having a cod end and suspenders directed forwardly from the cod end, for use intermediate the cod end and suspenders, said expander ring comprising a ring of rigid material, clevises distributed circumferentially about each end face of the ring, at the respective sides of its general plane, each for engagement within edge meshes of the cod end and of the suspenders, respectively, and means to secure the clevises removably anchored to the ring.

3. An expander ring as in claim 2, wherein each clevis has a long and a short leg, and the ring is formed with bores for the receipt of said legs, whereby upon release of the securing means a clevis may have its short leg withdrawn from its bore for engaging its edge meshes, while its longer leg remains in its bore.

4. An expander ring as in claim 2, wherein the ring is formed with two bores to receive the respective leg of each clevis, said legs being notched transversely, and the ring having a locking pin bore intersecting the leg-receiving bores, and a locking pin received in said locking pin bore and in the notches of the legs, to lock the clevis to the ring.

5. An expander ring as in claim 4, including threaded means for retaining the locking pin in its bore.

6. An expander ring as in claim 5, including retentive plugs of frictional material inset into said threaded means and engageable with the bores in the expander ring wherein the threaded means are received, to maintain the latter in position to retain the locking pin, against accidental disengagement of the latter from the expander ring.

7. The combination of claim 1, wherein the expander ring is of metal, and hollow to afford it approximately neutral buoyancy.

8. The combination of claim 7, including a ballasting weight at the lower side of the ring, to maintain it upright.

9. An expander ring as in claim 2, wherein the clevis' legs are directed fore and aft in use, and the ring is formed with internal bosses similarly directed and bored for receipt of said legs.

10. An expander ring as in claim 9, wherein said bosses extend inwardly from the opposite end faces of the ring and are of such length that they abut and space apart such opposite end faces.

11. The combination of claim 1, including a closure formed of an annulus of netting, directed foe and aft within the entrance to the cod end, said closure being engaged along its forward edge with the expander ring and an elastic constrictor extending about the after edge of said closure.

References Cited in the file of this patent

UNITED STATES PATENTS

| | | |
|---|---|---|
| 37,667 | Shaw | Feb. 10, 1863 |
| 719,285 | Wechsler | Jan. 27, 1903 |
| 876,638 | Harrington | Jan. 14, 1908 |
| 1,561,631 | Winter | Nov. 17, 1925 |
| 2,728,540 | Ebneter | Dec. 27, 1955 |

FOREIGN PATENTS

| | | |
|---|---|---|
| 294,363 | Germany | Oct. 4, 1916 |
| 531,744 | Italy | Aug. 5, 1955 |